Aug. 4, 1931.  C. H. GOODYEAR  1,817,135
COLLAPSIBLE BOX
Filed Sept. 16, 1929  2 Sheets-Sheet 1
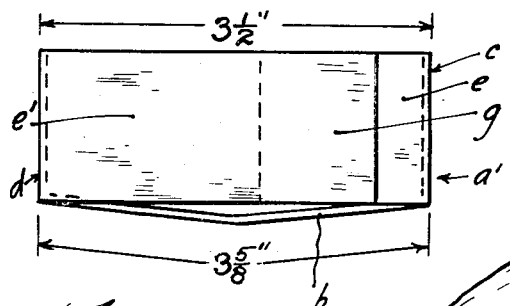
Fig. 2.
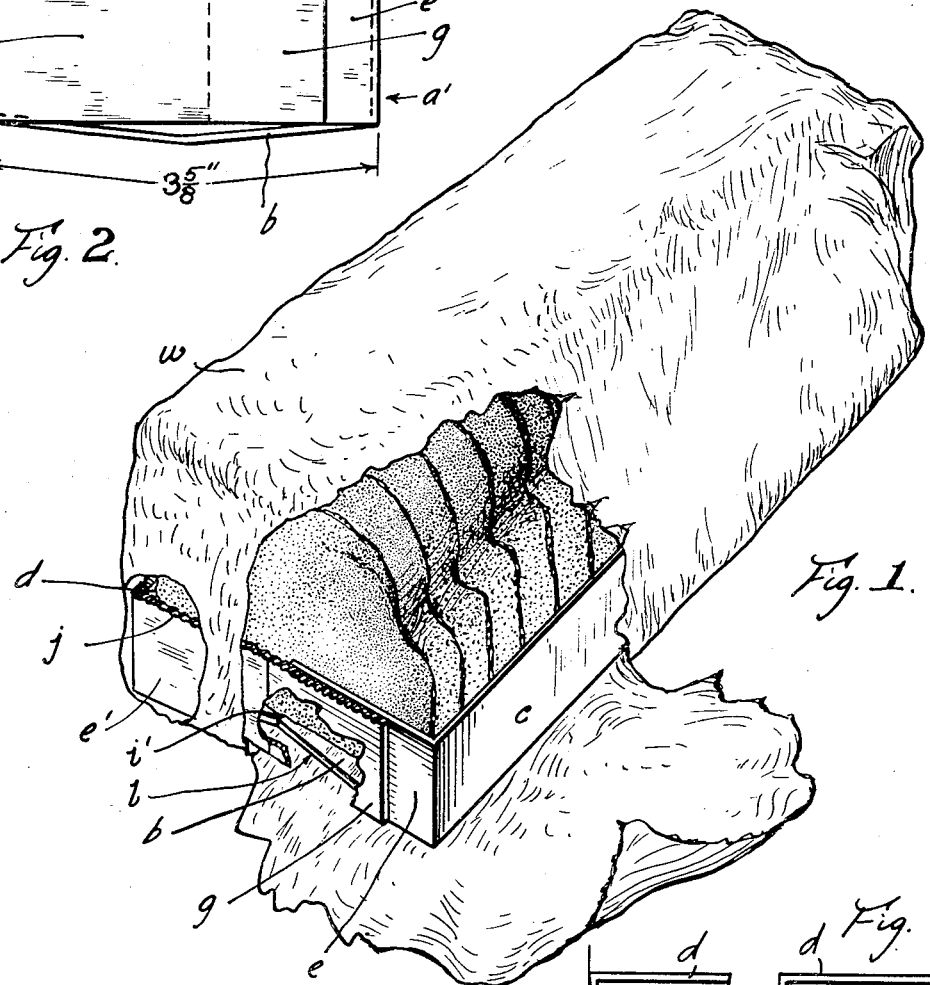
Fig. 1.
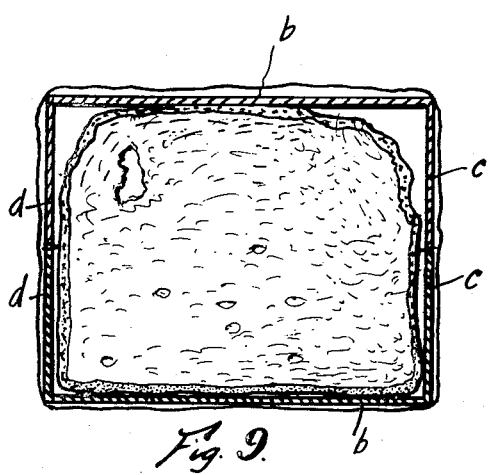
Fig. 9.
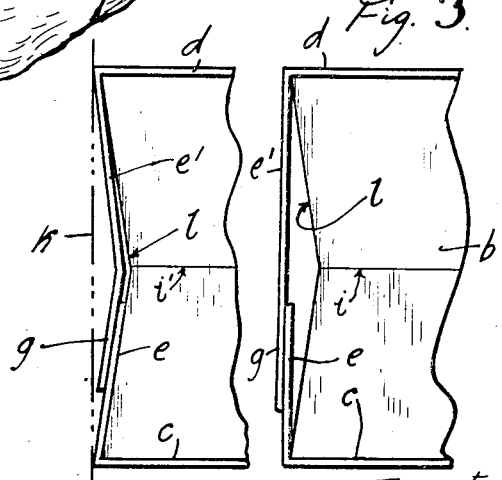
Fig. 3.  Fig. 3ª
Inventor
Charles H. Goodyear
*[signature]*
Attorney

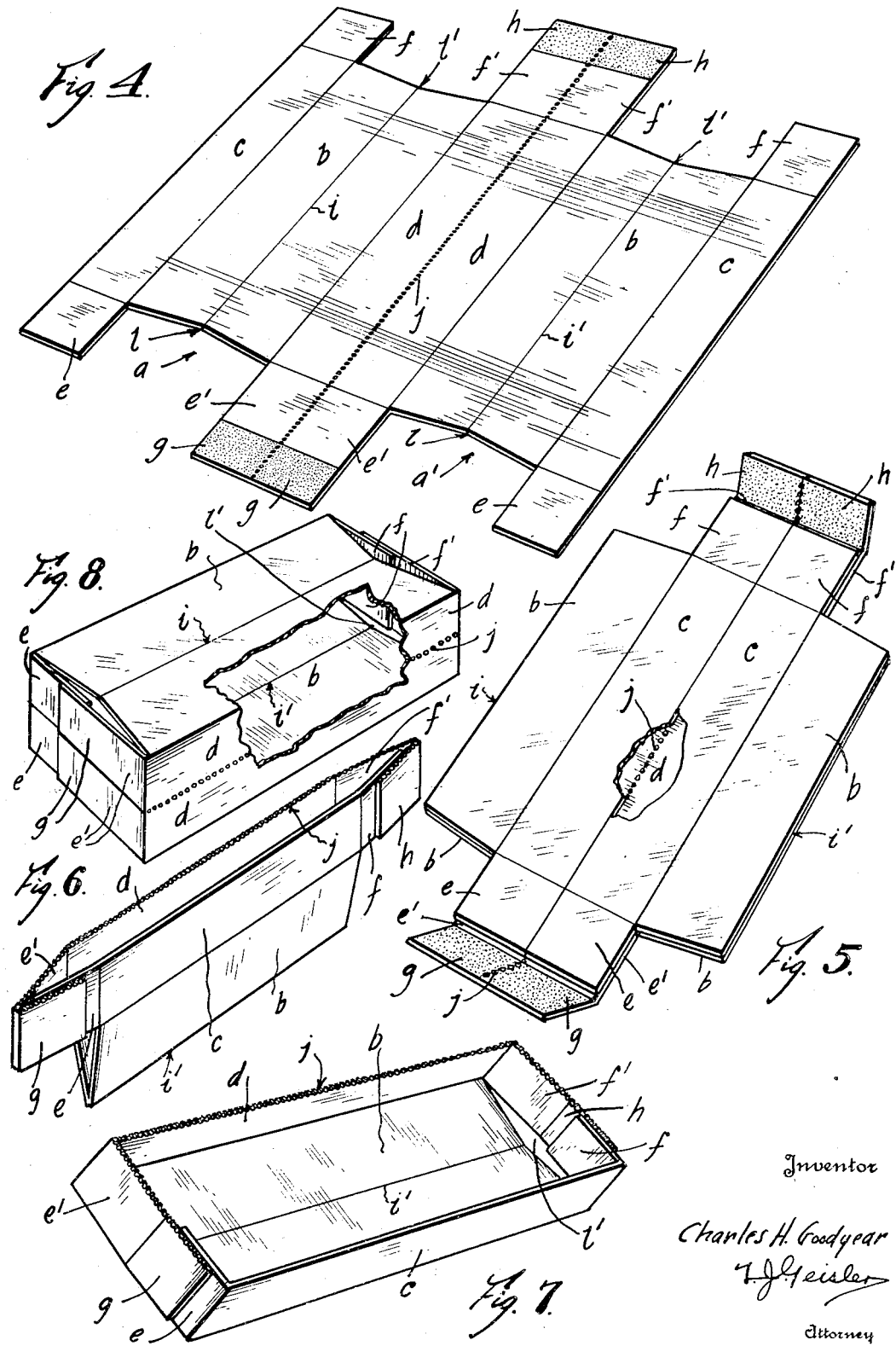

Patented Aug. 4, 1931

1,817,135

UNITED STATES PATENT OFFICE

CHARLES H. GOODYEAR, OF PORTLAND, OREGON

COLLAPSIBLE BOX

Application filed September 16, 1929. Serial No. 392,951.

Loaves of bread at present are frequently cut into slices and then wrapped up in a sealed wrapper so as to make it convenient for the consumer, and to keep the bread fresh. My invention relates particularly to containers for such loaves.

In order to facilitate the wrapping up of such a loaf, it is convenient to provide a box in which the loaf may be placed for the purpose of holding the cut slices compactly together, ready for being wrapped up by a sheet of paper; and my invention has for its object to provide a box which will efficiently serve such purpose.

Furthermore, these boxes must be collapsible, so that a quantity thereof may be supplied to the bakery in a compact bundle.

Furthermore, since the wrapping of the loaf is done by machine, such for example as that known as the Battle Creek bread wrapping machine, the said box, when set up, must have no parts projecting beyond the perimeter of the space allowed for the movement of the box holding the loaf, since the projecting part of the box would be liable to catch in some part of the wrapping machine; and this is another of the objects towards which my invention is directed.

A further object of my invention is to prevent the bottom of the box presenting at its ends any shearing edge tending to cut through the paper wrapping. This feature I deem essential since the cutting of the wrapper would break the seal about the bread which the wrapper is to effect, and thus permit the cut slices to dry out; and since the paper wrapper is generally of the so-called waxed paper type, it is easily broken if drawn tightly against a more or less stiff edge.

A further object of my invention is to provide a blank for making boxes of the character described which blank is adapted to make two similar sections which may be set up to make a box having a bottom and a top and adapted to contain a sliced loaf of bread to be shortly consumed, and therefore not required to be sealed up in a wrapper; or for making two similar, independent boxes each adapted to contain a cut loaf of bread for wrapping as above mentioned; the sections of the blank being provided at their line of jointure with a crease or perforation facilitating the separation of such section.

I attain the principal objects of my invention above enumerated in a collapsible box comprising a rectangular bottom section provided with hinged side wall sections having at their ends extensions adapted to form bars providing end walls for the box; the ends of the bottom section having recessions whereby to permit said bars to be moved slightly interior of the straight lines defining the ends-bounding-lines of the rectangle, without leaving shearing edges projecting at the ends of the bottom section beyond the said bars.

Such construction facilitates the wrapping of the bread, for when the bread is wrapped—the bread being soft and compressible—the wrapper will not be pressed over a projecting straight edge presented by the ends of the bottom section of the box, and tending to cut through the wrapper.

Furthermore, the length of said end bars, constituting the end walls of the box, is arranged slightly less than the width of the bottom section, so that said bars will be drawn taut before the bottom section has been arranged into a straight plane; in that way assuring that said bars will be drawn firmly against the ends of the loaf, and thus preventing their projecting and interfering with any part of the wrapping machine, during the movement therethrough of the box containing the loaf.

The further details of my box are hereinafter fully described, and illustrated in the accompanying drawings, in which:

Fig. 1 shows a perspective view of my box containing a wrapped loaf of bread, the wrapper being partly torn away in part so as to illustrate the arrangement of the details of the ends of the box as above mentioned;

Fig. 2 shows an elevation of one end of the box to illustrate that the length of the bars constituting the walls of the box are made slightly less than the width of the box when arranged in a straight plane and expanded to its full width;

Figs. 3 and 3a illustrate details of construction hereinafter described;

Fig. 4 shows the form of the blank for making my box; the blank as shown being adapted for making a box comprising a bottom portion and a top as above mentioned; or for separating the two sections of the blank into two independent boxes;

Fig. 5 shows the blank folded together for convenience in stacking the blanks in a bundle;

Fig. 6 illustrates the manner of folding each half section of the blank, and further illustrates the manner of securing the extensions at the ends of the bottom section of the box for forming the end walls thereof;

Fig. 7 shows the blank set up for forming a box ready to receive the load for wrapping;

Fig. 8 shows the blank set up for forming a box provided with a cover, the observer looking at the back of the box; and Fig. 9 shows a cross section of the box arranged as shown in Fig. 8 with a loaf contained in the box.

My box is formed of a blank cut in the shape illustrated by Fig. 4. It comprises two parts $a$ and $a'$ to be used together if a box with cover is desired, as illustrated in Fig. 8, or each part may be used to form a half box as illustrated by Fig. 7.

The description of one of said parts will suffice for both. Each part is composed of a rectangular main section $b$, provided along its longitudinal sides with wall sections $c$, $d$ each of the latter having longitudinal extensions $e$, $e'$, $f$, $f'$, and one end of such extensions having tabs as $g$, $h$, so that the extensions $e$, $e'$, $f$, $f'$ may be secured together.

In any event, one of the parts $a$ or $a'$ will be formed into a box; and thus the section $b$ thereof would be the bottom section. Said main section $b$ of the parts $a$ and $a'$ are preferably scored along their longitudinal middle as at $i$, and the extensions $e$, $e'$, $f$, $f'$ and tabs $g$, $h$ are likewise scored, so that both of the parts $a$ and $a'$ may be folded as illustrated by Fig. 5, and arranged flatwise one upon the other for bundling a quantity of my boxes in compact form. Along the line joining the two parts $a$, $a'$ may be provided perforations $j$ for their ready separation, if desired, for making two half boxes.

When my box is set up, the connected extensions $e$, $e'$ and $f$, $f'$ will form bars constituting the end walls of the box. Since the fresh bread, for which my box is primarily intended, is compressible, if the loaf be placed in a half box and sealed by a wrapper wrapped tightly about the box, there is a tendency to draw the end walls of the box inward of a straight line constituting the ends of the rectangle formed by the bottom section $b$, which to illustrate reference is had to the dash-and-dot line $k$ of Fig. 3a. Thus, if the ends of the bottom section were cut straight to form a line as $k$, it would present a shearing edge tending to cut through the wrapper $w$ drawn tightly over such edge; and such is very apt to be the case since the wrapper is of the waxed paper type.

In order to avoid such consequences, the ends of the bottom section $b$ are cut in, preferably to form angular recessions as shown by $l$ and $l'$ in Figs. 3 and 4. Thus, when the end walls formed by the extensions $e$, $e'$, $f$, $f'$ are drawn in by the wrapper, as illustrated by Fig. 3a, they will be alined with the lines of said recessions of the section $b$, and the leaving of projecting shearing edges as mentioned would be avoided.

Since the box containing the loaf of bread to be wrapped for sealing is usually wrapped by the aid of a wrapping machine as mentioned, it is necessary to assure that the end walls of the box be held within the perimeter of the space allowed for the movement of the box through the machine. To this end the length of the ends formed by the extensions $e$, $e'$, $f$, $f'$ is made slightly less than the section $b$ when expanded to its full width, thus assuring that the end walls will be drawn taut before the section $b$ is expanded to its full width, hence, when a loaf is placed in my box, and the bottom section $b$ is consequently expanded so as to become more or less arranged in a straight plane, the end walls of the box will be positioned so as to lie within the allowed space for the movement of the box.

I claim:

1. A paper box for containing a compressible article of the character described, sealed in a wrapper, said box comprising a rectangular bottom section provided with hinged side wall sections, the latter provided at their ends with longitudinal extensions and secured together to form barlike, inwardly movable end walls of the box, and the ends of the bottom section having obtuse recessions, whereby to cause the inward displacement of said end walls in conformity with said end recessions of the bottom upon the wrapping of the article placed in said box by a wrapper drawn tightly over the box and the article, and thus avoid the upper edges of said end walls presenting shearing edges to the end portions of the wrapper.

2. A blank for collapsible paper box for containing a compressible article of the character described, sealed in a wrapper, said box comprising a rectangular bottom section provided with hinged side wall sections, the latter provided at their ends with longitudinal extensions, one overlapping the other and adapted for being secured together to form bar-like, inwardly movable end walls of the box, and the ends of the bottom section having obtuse recessions, whereby to cause the inward displacement of said end walls in conformity with said end recessions of the bottom upon the wrapping of the article placed in said box by a wrapper drawn tightly over the box and the article, and thus avoid the upper edges of said end walls presenting shearing edges to the end portions of the wrapper.

3. A collapsible paper box for containing a compressible article of the character described to be sealed in a wrapper, said box comprising two equal, similar lateral sections separably united at their longitudinal medial line, and constituting bottom and cover sections, respectively, each section comprising a rectangular bottom provided with hinged side walls, the latter provided at their ends with longitudinal extensions secured together to form bar-like, inwardly movable end walls of the box, the ends of the bottom section having obtuse recessions, whereby to cause the inward displacement of said end walls in conformity with said recessions upon the wrapping of the article placed in said box by a wrapper drawn tightly over the box and the article, and thus avoid the upper edges of said end walls presenting shearing edges to the end portions of the wrapper.

4. A collapsible paper box for containing a compressible article of the character described to be sealed in a wrapper, said box comprising two equal, similar lateral sections separably united at their longitudinal medial line, and constituting bottom and cover sections, respectively, each section comprising a rectangular bottom provided with hinged side walls, the latter provided at their ends with longitudinal extensions secured together to form bar-like, inwardly movable end walls of the box, the ends of the bottom section having obtuse recessions, whereby to cause the inward displacement of said end walls in conformity with said recessions upon the wrapping of the article placed in said box by a wrapper drawn tightly over the box and the article, and thus avoid the upper edges of said end walls presenting shearing edges to the end portions of the wrapper, the bottom sections being scored along their longitudinal medial line to permit folding of said sections one upon the other as described.

CHARLES H. GOODYEAR.